United States Patent [19]
Glover et al.

[11] 3,970,497
[45] July 20, 1976

[54] END TRIM PLYWOOD PROCESS

[75] Inventors: Clinton G. Glover, Clarkston, Wash.; Jack H. Markley; Patrick J. Young, both of Lewiston, Idaho

[73] Assignee: Potlatch Corporation, San Francisco, Calif.

[22] Filed: Dec. 30, 1974

[21] Appl. No.: 537,342

Related U.S. Application Data

[62] Division of Ser. No. 351,544, April 16, 1973.

[52] U.S. Cl. ............................. 156/182; 144/309 Q; 144/315 R; 156/250; 156/267; 156/300; 428/50; 428/106
[51] Int. Cl.² ..................... B27D 1/04; B32B 31/18; B32B 31/20
[58] Field of Search ........... 156/182, 250, 265, 266, 156/267, 300, 299, 559, 562, 296; 144/309 Q, 313, 314 R, 314 A, 315 R, 315 A, 316; 428/535, 106, 114, 191, 50

[56] References Cited
UNITED STATES PATENTS

| | | | |
|---|---|---|---|
| 1,594,889 | 8/1926 | Loetscher | 144/316 |
| 2,572,772 | 10/1951 | Skoog | 156/296 |
| 3,415,707 | 12/1968 | Barnes | 156/559 |
| 3,730,797 | 5/1973 | Jensen | 156/182 |
| 3,769,143 | 10/1973 | Kulesza | 156/297 X |

Primary Examiner—William A. Powell
Assistant Examiner—M. G. Wityshyn
Attorney, Agent, or Firm—Wells, St. John & Roberts

[57] ABSTRACT

A plywood product utilizing a core panel produced from plywood strips salvaged from edge trim produced by conventional trimming operations during plywood production. The trim strips, having parallel side edges, are laid up side by side and edge glued to produce a flat core panel. Outer layers of veneer are glued at each side of the core panel to produce a resulting thick plywood structure suitable for building purposes. The method comprises the production of the strips, the composing of the strips into panels, and the final step of gluing veneers at each face of the core panel to produce a plywood product of greater thickness than most conventional plywood.

7 Claims, 4 Drawing Figures

END TRIM PLYWOOD PROCESS

This is a division of application Ser. No. 351,544, filed Apr. 16, 1973.

BACKGROUND OF THE INVENTION

This invention is concerned with utilization of plywood waste material available in conventional plywood manufacturing operations. Veneer produced for plywood production purposes must be cut to dimensions greater than the desired plywood sheet dimensions to permit final trimming of each plywood sheet and to minimize voids or recesses at the edges of the several veneer layers. Furthermore, all veneers are initially trimmed to the same dimensions whether they are to be used with their grain running along the length of the plywood sheet (as "centers" or "faces") or with their grain perpendicular to the length of the sheet (as "cross bands"). In order to leave an excess of at least 1 inch along any side of a sheet of veneer in a plywood sheet 4 by 8 ft. in size it is typical to produce veneer sheets approximately 100 inches in length or more along the grain direction. The 4 inch excess in veneer length permits cutting of the veneers for use as cross band material. A typical veneer sheet width is approximately 50 inches or one-half the full veneer length. As a result, there is a trim strip of approximately 1 inch at each side of a plywood sheet and approximately 2 inches at each of its ends. Because the end trim material equals approximately 4% of the total veneer utilized at the plywood mill, substantial material salvage can be accomplished by utilization of end trim. Plywood edge trim conventionally cannot be used except as fuel.

Prior U.S. Pat. No. 2,572,772 is directed toward use of trimmings from plywood sheets, teaching the layup of the sheets into panels with the veneers parallel and face glued. This results in a panel having substantial areas of end grain surface, more analagous to laminated wood beams than to plywood, which typically has large areas of longitudinal and transverse grain veneer material.

Another patent of interest is Alenius U.S. Pat. No. 3,133,850, which is concerned with continuous plywood production, including use of lumber strips as core materials. It has no direct teaching concerning salvage of plywood trim strips.

According to this disclosure, plywood trim strips are edge glued to produce a core panel having coplanar surfaces at each side similar to the conventional face surfaces of a plywood panel, but composed of discontinuous veneer strips. This core panel is then used as the center of a thick plywood sheet by addition of cross bands and face veneers at each side of the core panel.

Besides the benefits of salvaging substantial amounts of the total veneer used in plywood production, the process has the further advantage of permitting the pressing and curing of thick plywood panels in a greatly reduced time, since the pressing requires curing of only the glue lines outward from the prepared core panel. In contrast, preparing identically thick plywood panels by conventional plywood layup methods requires curing of all the glue lines, which greatly slows the production of plywood. The time required for complete heating of plywood in a press increases with the number of plies and total sheet thickness. Likewise, producing thick plywood panels by face gluing two equally thick panels or by gluing them to a center cross band also requires heating of the center glue lines through the bulk of the entire assembly.

The plywood product that results from this process is much thicker than average plywood and has substantially the strength properties of conventional plywood of the same thickness. The strength of plywood in normal applications reflects mostly the strength of the outer one or two plies, which in this product are of conventional structure and quality.

SUMMARY OF THE INVENTION

The laminated wood panel product comprises a solid central core including a plurality of elongated narrow plywood strips having a common thickness, the face veneer surfaces of the strips presenting oppositely facing planar core surfaces and their edges being composed in abutment with one another. A first layer of wood veneer is individually secured by surface adhesive to each of the planar core surfaces. A second layer of wood veneer is secured by surface adhesive to the outer surfaces of the first layer. The wood grain of the two layers of veneer at each side of the core are at right angles to one another. In the preferred forms of the invention, the panel includes cross band veneers sandwiched between the core and outer face veneers or centers.

The process comprises the step of composing the solid central core from a plurality of narrow plywood strips with the edges of adjacent strips in abutment with one another. Next, a first layer of wood veneer is placed over the face veneer surfaces of the plywood strips at each side of the core. Then, a second layer of wood veneer is placed over the first layer at each side of the core and surface adhesive between the respective core and layers of veneer are cured by application of heat and pressure.

The first object of this invention is to provide a commercially practical method of utilizing end trim from conventional plywood manufacturing processes to produce a usable laminated plywood product.

Another object of this invention is to provide a process which will appreciably increase the production of a plywood manufacturing plant without requiring an increase in the amount of veneer supplied to it.

Another object of this invention is to provide a practical method of producing laminated wood panels closely related to conventionally-defined plywood and having greater-than-usual thickness relative to most plywood.

Another object of this invention is to provide a plywood process in which thick panels are manufactured without requiring simultaneous curing of glue lines throughout the panel thickness.

Another object of this invention is to provide an end product in the form of a thick laminated plywood panel suitable for plywood construction applications.

These and further objects will be evident from the following disclosure, taken together with the accompanying drawings, which describe a preferred form of the process and resulting product.

DESCRIPTION OF A PREFERRED EMBODIMENT

This disclosure is concerned with plywood production techniques and components which are generally known and understood in the industry. To begin, a usable dictionary definition of "plywood" is "a material used for various building purposes, consisting essentially of an odd number of veneers glued over each other, usually at right angles". In the plywood industry, the components of a plywood assembly are designated as "faces", "cross bands", or "centers". The outer plies of a plywood panel, generally having wood grain running longitudinally along the long dimension of the panel, are called "faces". The veneer that comprises the outer ply is known as a "face veneer". The "cross bands " have grains running perpendicular to the "faces". During plywood layup, adhesive is applied to the outer surfaces of the "cross bands", which adhesive then secures the adjacent veneer surfaces in the final assembly. All other inner plies of veneer with grain parallel to the longitudinal direction of the panel are known as "centers".

Plywood production in the United States is standardized to result in rectangular plywood panels 4 feet wide and 8 feet long, the long dimension being the direction of wood grain along the faces. While the size of the veneers varies from one plant to another, they typically begin with a length along the grain of about 100 inches, which, when sliced along their centerlines, produce cross bands of 50 inch dimension along the grain. This assures at least 1 inch of trim along the respective sides of each ply in the resulting plywood. In practice, it results in a 1 inch trim along the length of the plywood panel and a 2 inch trim at each end of the panel. Of the total 4 inches trimmed from the panel end in producing each 8 foot plywood panel, at least 2 inches or more is sound and recoverable. It is this material that is used in the production of the product shown in FIG. 1.

Figure 1:
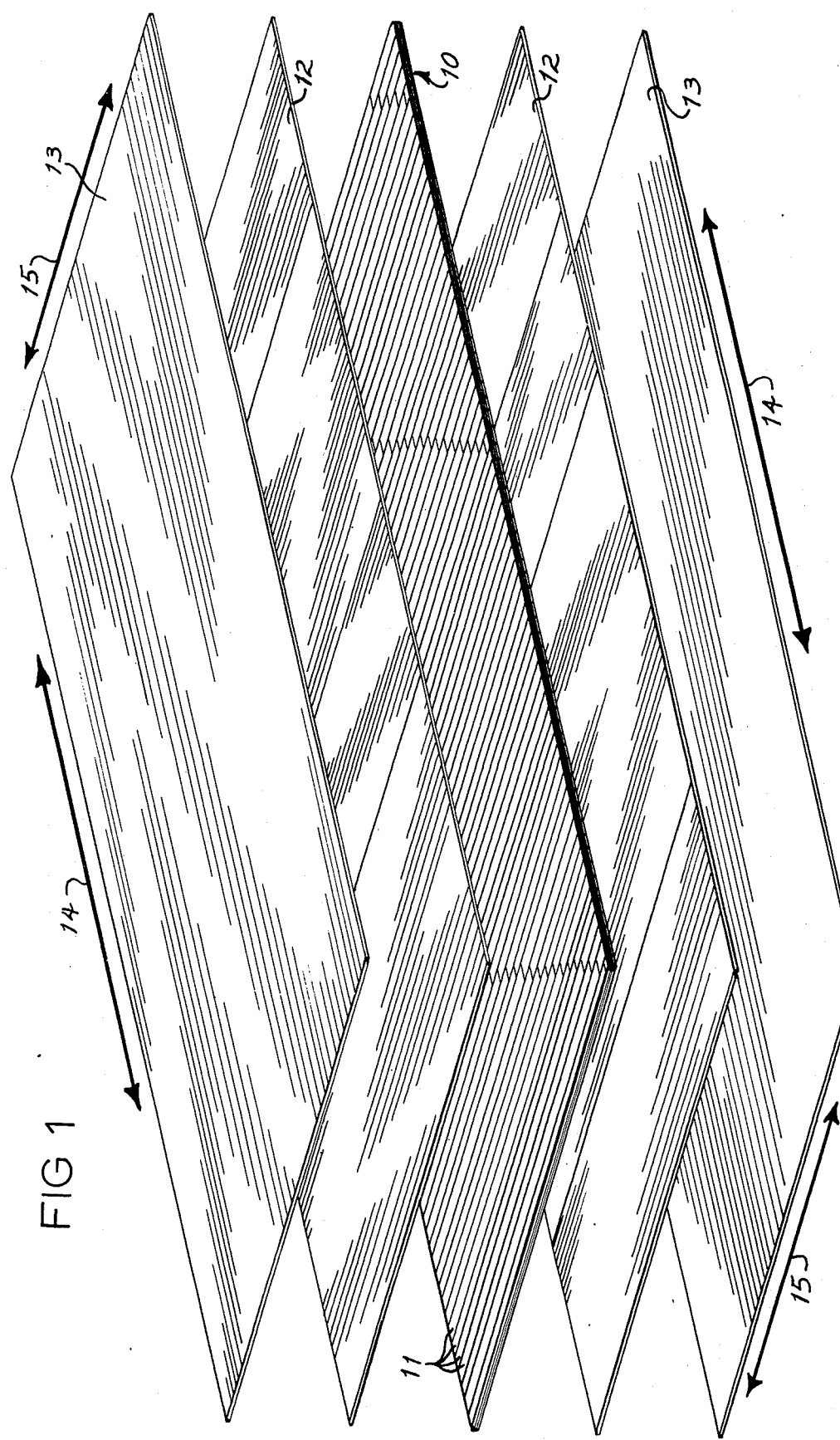
FIG. 1 is an exploded perspective view of the laminated wood panel.

FIG. 1 shows an exploded view of the thick laminated plywood product. In describing the product as "plywood", it is intended to use the word in a broad sense. While it is recognized that the present product does not meet certain industry standard definitions for "plywood", yet the product has all of the basic and essential properties of plywood and is interchangeable with conventional plywood in most applications.

The product comprises a central core panel 10 comprising a plurality of edge-glued end trim strips 11. At each side of core panel 10 is a layer of cross bands 12 and a face veneer 13. Adhesive is used between cross bands 12 and the core panel 10, as well as between the cross bands 12 and faces 13.

The resulting product is a thick plywood panel having a solid central core of discontinuous plywood strips. The edge-glued bond between the strips 11 is utilized primarily for fabrication purposes, and is not believed to contribute significantly to the strength of the final product. Since the strength of plywood or other laminated wood structures depends principally upon the strength of the outer one or two layers in the laminate, the thick plywood panel has been found to have most of the same strength characteristics and properties found in conventional plywood of the same thickness made entirely from full-sized veneers.

Tests have found that the end trims are adequately bonded and no problems are anticipated due to delamination of the plies in the individual strips. All veneers used in the laminated wood panels shown in FIG. 1 meet the requirements of existing product standards in the United States. The only deviation from industry standards is the use of the end trim core panel 10. The veneers and glue lines in the core panel 10 meet existing standards, except that the butt-joints formed by the end trim strips 11 cause the product to fall outside current standards.

Much of the strength and dimensional stability of any plywood product relates to the grain orientation of the various veneer layers. Plywood by definition is distinguished by alternate layers of veneer with their respective grain orientation perpendicular to one another. This contrasts with laminated products having layers of veneer or boards having parallel grain orientation. For reference purposes, the longitudinal dimension of the laminated panel assembly and each individual veneer shown in FIG. 1 is in the direction indicated by arrows 14 and the transverse or perpendicular dimension or direction is indicated by arrows 15. In the preferred embodiment of the invention, the elongated strips 11 are salvaged from end trim removed from plywood panels during "skinning" or trimming of the panels to size. Using arrows 14 and 15 as references, the three-ply strips 11 have outer faces with longitudinal grain orientation and a center cross band with transverse orientation. They are covered by cross bands 12 having transverse grain orientation and faces 13 having longitudinal grain orientation. Therefore, the alternation of grain direction is achieved throughout the panel in all veneer layers, whether continuous or discontinuous.

The panel shown in FIG. 1 can have any desired dimension. However, to complement standard plywood production so that the panel can be pressed within conventional equipment, it is desirable that it be made to the conventional size. As an example, the scale of the FIG. 1 shows a thick plywood sheet 4 feet wide (parallel to arrows 15) and 8 feet long (parallel to arrows 14). It is comprised of a three-ply core panel 10, each veneer in strips 11 being approximately 1/6 inch in thickness, resulting in a ½ inch total thickness in the core. The strips are 1 ½ inches in width. The addition of two plies at each side of the core panel, each 1/6 inch in thickness, creates a total thickness of 1 1/6 inches, which would be commercially identified by the nominal size of 1 ⅛ inch plywood. In the plywood industry, "thick plywood" is a term generally designating panels having a thickness of ⅞ inch or more. Most thick plywood has a thickness between ⅞ inch and 1 ⅛ inch.

Thick plywood constructed as shown in FIG. 1 has essentially the same strength and stiffness as conventional thick plywood. This is because the face veneers provide the major contribution to strength and stiffness when plywood panels or other laminated wood products are stressed in flexure, which is the common load characteristics for such products.

In applications where the principal stress is in tension or sheer through the thickness of the panel, the laminated panel shown in FIG. 1 will have about half the strength of conventional thick plywood. Applications where this type of stress is critical are rare in plywood usage.

The panel shown in FIG. 1 is expected to give satisfactory performance in many typical construction uses. These include use as roof and floor decking, combination sub floor underlayment, industrial cut-up applications such as in production of chair seats, and miscellaneous uses such as in production of bench tops, shelves, pool tables etc.

This disclosure is not intended to be limiting as to veneer or panel thickness. The thickness of the laminated panels produced at any plywood plant will be influenced by the dominant thickness of veneers and plywood panels conventionally produced at the plant. End trim from any conventional plywood sheet can be utilized, with one, two or more veneer layers at each side of the core panel as necessary to produce the desired total panel thickness. The quality of the panel can be modified by proper selection of the quality of veneers used on the faces. Either interior or exterior adhesive can be used, both in the original plywood production techniques that result in the strips 11 and in the final fabrication of the laminated panel. Choice of adhesives is determined by the type of ultimate end use required of the plywood sheets.

Figure 2:
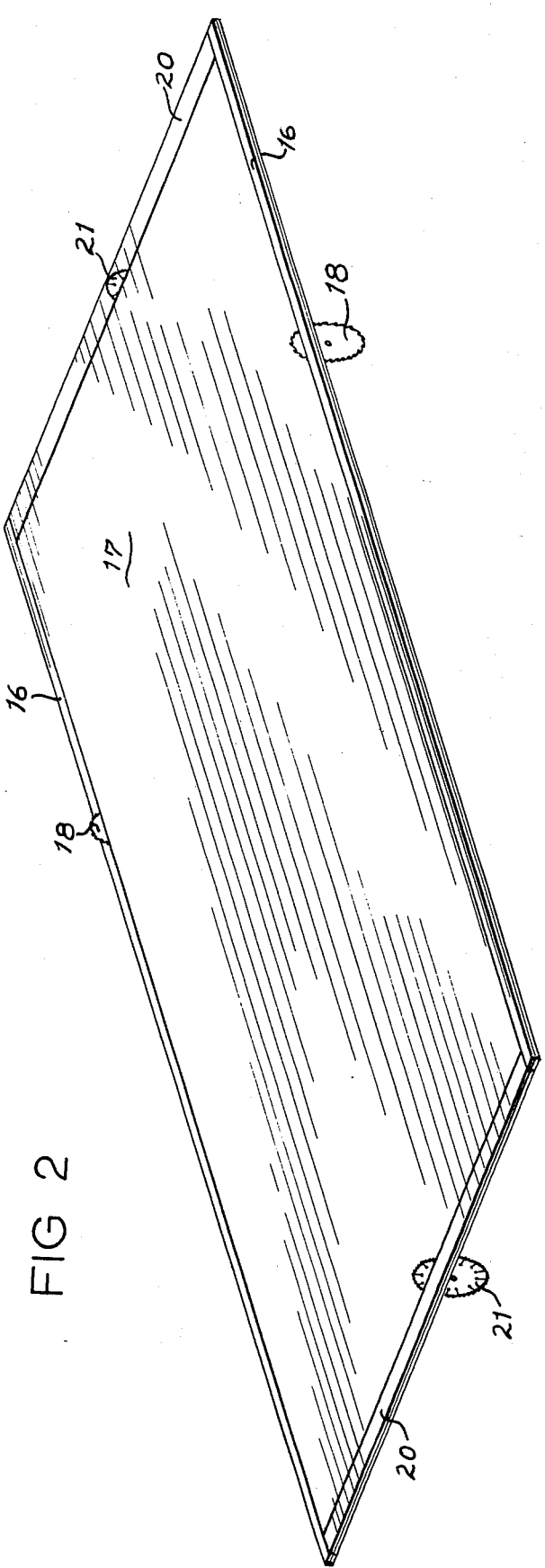
FIG. 2 is a top schematic view illustrating the "skinning" of a plywood panel.
Figure 3:
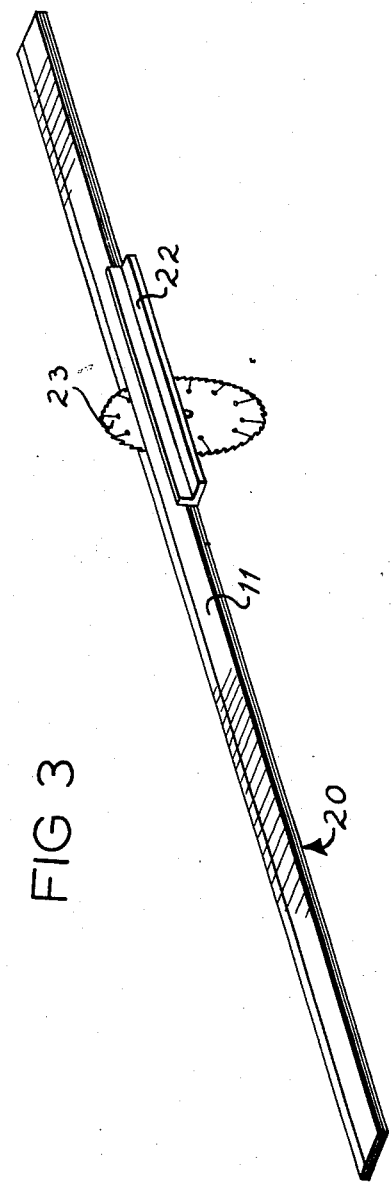
FIG. 3 is a top schematic view illustrating the production of strips from plywood trim.
Figure 4:
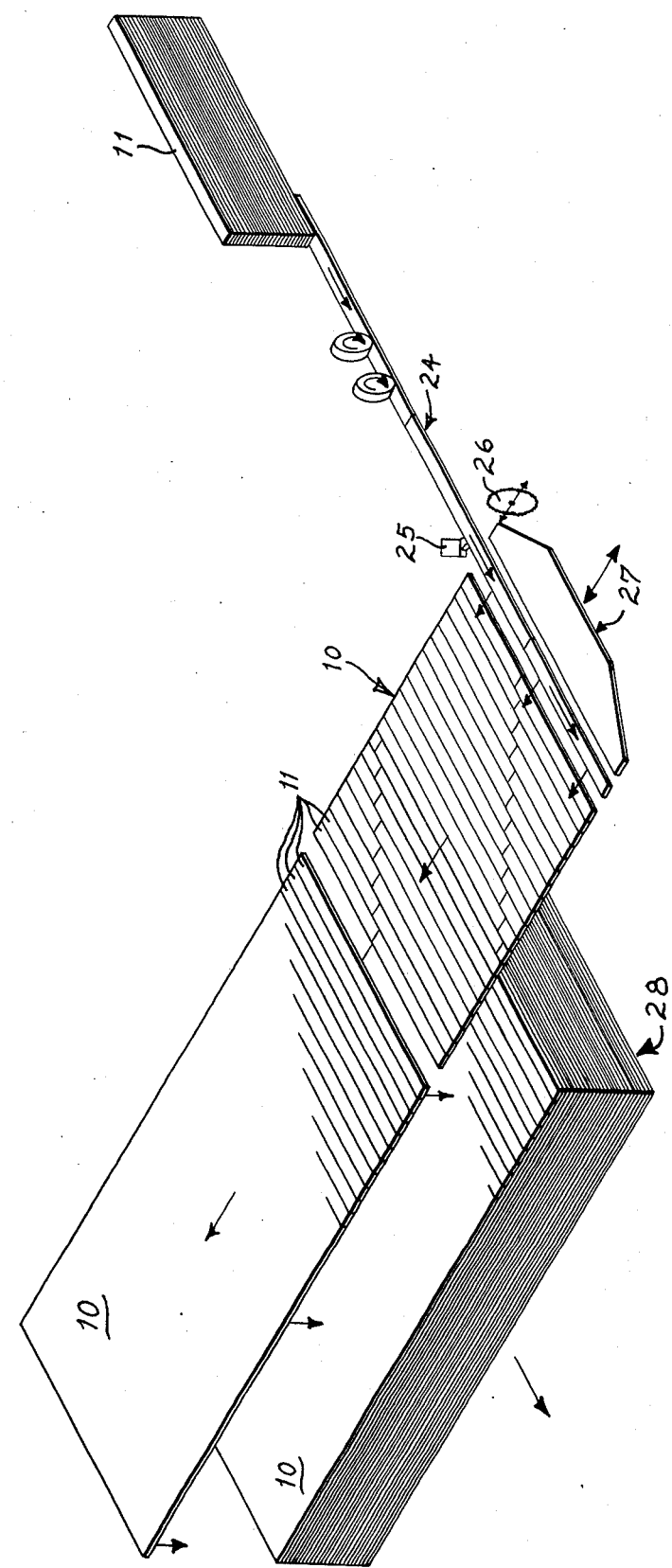
FIG. 4 is a schematic view of an apparatus for assembling a core panel.

The method steps involved in producing the core panels and laminated panels can best be understood with reference to FIGS. 2, 3 and 4. FIG. 2 schematically illustrates the "skinning" or edge trimming of a plywood sheet. This is first accomplished by removal of side trim 16 from both sides of the desired rectangular panel 17, using longitudinal saws 18. Following removal of the side trim, which is relatively narrow in comparison to the end trim, the end trim 20 is cut from both ends of panel 17 by transverse saws 21. The length of the end trim 20 along the length of each panel 17 is typically even at both panel ends. This has been found to be suitable for the production of core panels, and with a 4 inch total end trim, a satisfactory percentage of complete strips 1 ½ inch in width has been demonstrated. If desired, the end trim at one end of the panel can be lessened, and the strips taken entirely from the other end. By concentrating the end trim at one end of each panel, a satisfactory percentage of sound strips can be achieved having widths between 2 ½ and 3 inches.

FIG. 3 illustrates the trimming of strips 11 to produce parallel side edges perpendicular to the grain orientation along their faces. This could be accomplished during skinning of the plywood panel 17, by using paired saws spaced apart the width of the desired strip. However, to eliminate the need for conversion of existing equipment and methods used in conventional skinning operations, the trimming of the stip 11 can be accomplished independently of the skinning operation (FIG. 3) by moving the end trim 20 between a guiding straight edge 22 and spaced saw 23. The length of each strip 11 will be identical, since it is determined by the width of panel 17 during removal of the side trim 16.

FIG. 4 schematically illustrates the steps involved in composing relatively large core panels 10 from the strips 11. The strips 11 are fed from a storage stack in a longitudinal row at 24, where each strip is crowded endwise against the preceding strip. Glue is applied to one edge of each strip by an applicator 25. Conventional "hot melt" glue is used to provide immediate bonding of the edges for fast production purposes. A cutoff saw 26 periodically moves transverse to the strip to cut the strip to a constant length within the core panel 10. Unglued end joints are included within panel 10, since it is necessary that the core panel be of a width slightly greater than the desired final width of the laminated panel within which it will be utilized. Again, in the production of a 4 by 8 foot thick plywood panel, the core panel 10 should be approximately 50 inches in width and 100 inches in length. Since the end trim 20 is 48 inches along its length, end joints are necessary. However, it has been found that the glued butt-joints along the abutting long edges between adjacent parallel strips are sufficiently adequate to assure proper positioning of the strips 11 within core panels 10 prior to layup of the thick plywood.

The cut strips 11 are compressed against one another by a reciprocating ram 27 and associated conveyors which properly feed the built up core panel 10 during setting of the glue applied to the strip edges. The finished core panels are then stacked, as shown at 28 in FIG. 4, and delivered to the plywood layup station at which they will be used.

The core panel 10 lends itself to direct use in plywood production. The cross bands 12 applied at both sides of core panel 10 are first subjected to application of adhesive on both surfaces by conventional glue spreading devices (not shown) and the cross bands 12 with glue applied are laid up between the core panel 10 and faces 13 (or centers where further layers of veneer are desired). The composite panel is then pressed in a conventional plywood press and subsequently "skinned " or trimmed to size. The adhesive between the cross bands 12 and the core panel 10 and the faces 13 is cured by application of pressure and heat perpendicular to the veneer surfaces.

One advantage of this process is that it is not required that the entire panel be heated to the center, since the adhesive being cured is at the outer layers of the assembly. This reduces the time of heating and pressing as compared to conventional production of comparable thick plywood. It also reduces the tendency of the liquid adhesive to damage the assembly by "blows " or production of steam within sealed pockets at the interior of the plywood assembly.

Modification might be made in the product or process disclosed above. For these reasons, the examples listed in the details provided herein are not intended to restrict or limit the scope of the appended claims.

Having thus described our invention, we claim:

1. A process for producing a laminated plywood panel, comprising the following steps in sequence:
    a. trimming sides and ends of conventional plywood panels to form standard size rectangular plywood sheets and salvaging end trim strips therefrom that are of a predetermined minimum width and have face veneers with wood grain thereof running perpendicular to the length of the end trim strip;
    b. sawing each salvaged end trim strip along a line parallel to its trimmed edge to produce a rectangular strip;
    c. assembling a solid central core from a plurality of the rectangular end trim strips of common thickness by arranging the strips in a coplanar panel configuration with the strips parallel to one another and to one edge of the core, with side edges of adjacent strips being in abutment with one another and the face veneer surfaces of the plywood strips presenting oppositely facing planar core surfaces;
    d. placing a first layer of wood veneer over the face veneer surfaces of the plywood strips at each side of the core with a layer of adhesive between the first layers of wood veneer and the core;
    e. and curing the layers of adhesive by application of heat thereto while under surface pressure perpendicular to the layers of adhesive.

2. A process as set out in claim 1 wherein the step of assembling the solid central core includes the step of securing each plywood strip to the plywood strips adjacent thereto by application of adhesive along the edges of the strips parallel to the one edge of the core and subsequent application of pressure to these strips perpendicular to the edges on which the adhesive is applied.

3. A process as set out in claim 1 further including in sequence following the step (b), the following step:

b₁. placing a second layer of wood veneer over each of the first layers of wood veneer with a layer of adhesive between the first and second layers of wood veneer with the grain structure thereof running perpendicular to the grain structure of the first layers of wood veneer.

4. A process for forming a laminated panel with a solid plywood core panel, said core panel being constructed from a plurality of joined plywood end trim strips with said strips having common thickness and each having a rectangular configuration including elongated side edges and end edges and with oppositely facing outer veneer surfaces bounded by the sides and end edges with the grain structure of the outer veneer surfaces running substantially perpendicular to the side edges, comprising the following steps in sequence:

a. forming the solid plywood core by arranging a plurality of said strips in a contiguous group with the strip side edges abutting one another and with the outer veneer surfaces coplanar;

b. placing first layers of veneer over the coplanar assembled outer veneer surfaces at each side of the core with a layer of adhesive between the first layers of veneer and the coplanar outer veneer surfaces of the core; and c. curing the layers of adhesive by application of heat and pressure perpendicular to the veneer surfaces.

5. A process as set out in claim 4, further comprising the step in sequence following the step (b), of:

b₁. placing a second layer of wood veneer over each of the first layers of wood veneer with a layer of adhesive between the first and second layers of wood veneer with the grain structure of the respective second layers running perpendicular to the grain structure of the first layers.

6. A process as set out in claim 4 wherein the plywood strips are produced by cutting plywood end trim along parallel lines perpendicular to the direction of orientation of the wood grain at their face veneers.

7. A process as set out in claim 4 including the further step of securing each plywood strip to the plywood strips adjacent thereto by application of a hot melt adhesive along the side edges of the strips and subsequently applying pressure to these strips perpendicular to the edges on which the hot melt adhesive is applied.

* * * * *